(12) United States Patent
BenMoshe et al.

(10) Patent No.: US 10,021,382 B2
(45) Date of Patent: Jul. 10, 2018

(54) CALIBRATING A ONE-DIMENSIONAL CODED LIGHT 3D ACQUISITION SYSTEM

(71) Applicant: Intel Corporation, Santa Clara, CA (US)

(72) Inventors: Sagi BenMoshe, Kiryat Byalik (IL); Ron Kimmel, Haifa (IL); Alex Bronstein, Haifa (IL); Michael Bronstein, Lugano (CH)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/200,564

(22) Filed: Jul. 1, 2016

(65) Prior Publication Data

US 2016/0316198 A1 Oct. 27, 2016

Related U.S. Application Data

(62) Division of application No. 13/669,639, filed on Nov. 6, 2012, now Pat. No. 9,462,263.

(60) Provisional application No. 61/556,304, filed on Nov. 7, 2011.

(51) Int. Cl.
*H04N 17/00* (2006.01)
*G06T 7/00* (2017.01)
*G06T 7/80* (2017.01)

(52) U.S. Cl.
CPC ............. *H04N 17/002* (2013.01); *G06T 7/85* (2017.01)

(58) Field of Classification Search
CPC ........ G06T 7/0018; G06T 7/002; G06T 7/004; G06T 5/006; H04N 13/0246
See application file for complete search history.

(56) References Cited

U.S. PATENT DOCUMENTS

| 6,970,591 | B1 | 11/2005 | Lyons et al. | |
|---|---|---|---|---|
| 2003/0137508 | A1* | 7/2003 | Appel | G06T 17/00 345/419 |
| 2003/0156751 | A1* | 8/2003 | Lee | G06K 9/03 382/154 |
| 2003/0222984 | A1 | 12/2003 | Zhang | |
| 2004/0096097 | A1 | 5/2004 | Nister | |
| 2007/0076977 | A1 | 4/2007 | Chen | |
| 2007/0161854 | A1 | 7/2007 | Alamaro | |
| 2007/0237417 | A1 | 10/2007 | Agrawal | |
| 2007/0253618 | A1* | 11/2007 | Kim | G06T 7/80 382/154 |
| 2009/0153669 | A1 | 6/2009 | Kim | |
| 2009/0245690 | A1* | 10/2009 | Li | G06T 7/80 382/285 |
| 2010/0079598 | A1 | 4/2010 | Ke | |
| 2011/0025853 | A1 | 2/2011 | Richardson | |

OTHER PUBLICATIONS

Fusiello, Andrea "Elements of Geometric Computer Vision" URL: http://www.diegm.uniud.it/fusiello/teaching/mvg/cism2010.pdf, Apr. 12-14, 2010, Udine, 164 pages.*

(Continued)

*Primary Examiner* — Nathnael Aynalem
(74) *Attorney, Agent, or Firm* — Trop Pruner & Hu, P.C.

(57) ABSTRACT

A camera intrinsic calibration may be performed using an object geometry. An intrinsic camera matrix may then be recovered. A homography is fit between object and camera coordinate systems. View transformations are finally recovered.

12 Claims, 4 Drawing Sheets

(56) References Cited

OTHER PUBLICATIONS

Kannala et al. "Geometric Camera Calibration" URL:http://www.ee.oulu.fi/~jkannala/publications/preprintECEWiley2008.pdf, Jan. 7, 2008, University of Oulu, Finland, 20 pages.*

Fusiello, Andrea "Camera Calibration: Problems and Algorithms" URL: https://pdfs.semanticscholar.org/43c3/8f8d777d23d9a9ede6c00ec6c5702025c8b1.pdf, VISMAC 2006, Palermo, 55 pages.*

Gasparini et al. "Plane-Based Calibration of Central Catadioptric Cameras" ICCV 2009—12th International Conference on Computer Vision, Sep. 2009, Kyoto, Japan. IEEE, pp. 1195-1202, 2009, <10.1109/ICCV.2009.5459336>. <inria-00586972>.*

* cited by examiner

CALIBRATING A ONE-DIMENSIONAL CODED LIGHT 3D ACQUISITION SYSTEM

CROSS-REFERENCE TO RELATED APPLICATION

This is a divisional of patent application Ser. No. 13/669,639 filed on Nov. 6, 2012 which is a non-provisional application based on provisional application Ser. No. 61/556,304 filed on Nov. 7, 2011, hereby expressly incorporated by reference herein.

BACKGROUND

This relates to calibration and calibration refinement of one-dimensional structured light active stereo three-dimensional (3D) acquisition.

Classical calibration methods can either project a two dimensional code in which each point in space has its own explicit relation to the projection unit, or use non-flat calibration objects with known dimensions by extracting measures between given detectable features. These measures are then used to simplify the calibration procedure of the system as a whole, or more specifically, find the relation between a non-calibrated projector and a pre-calibrated camera.

BRIEF DESCRIPTION OF THE DRAWINGS

Some embodiments are described with respect to the following figures.

DETAILED DESCRIPTION

Figure 1:
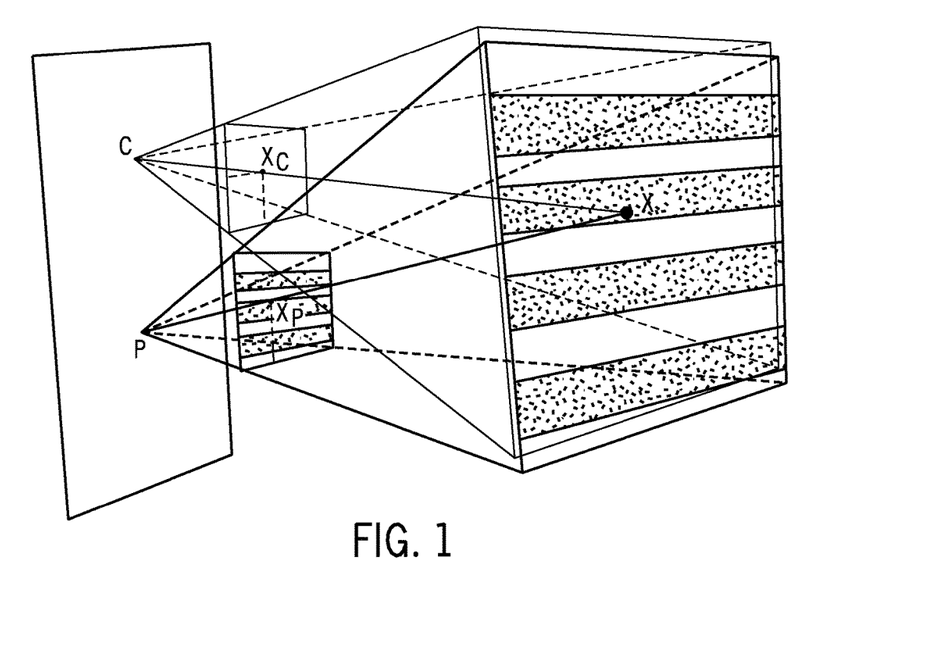
FIG. 1 is a depiction of a one-dimensional coded light reconstruction system P-projector, C-camera according to one embodiment.
Figure 2:
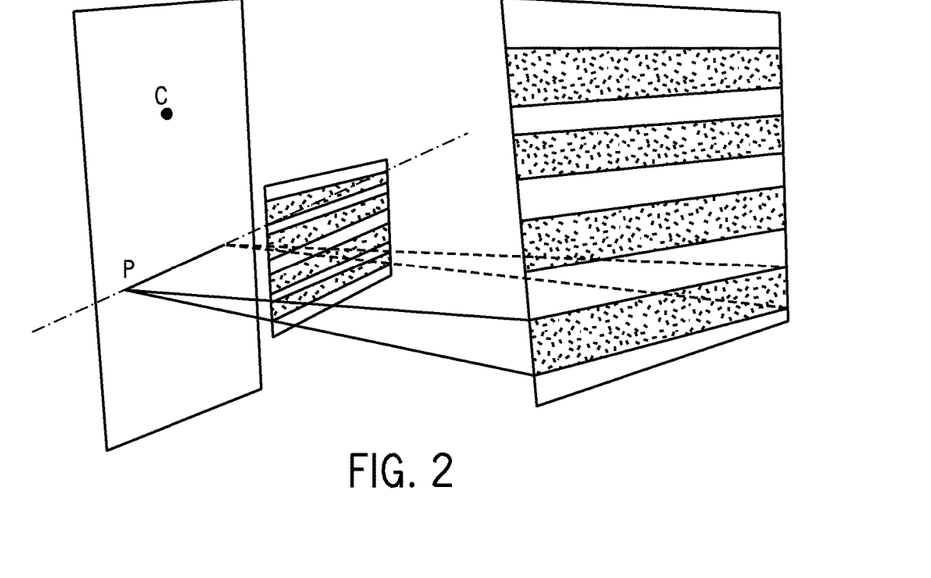
FIG. 2 is a depiction of a one-dimensional coded light projector for a 3D reconstruction system P-projector, C-camera according to one embodiment.

A calibration system for a one dimensional coded light 3D acquisition system is shown in FIGS. 1 and 2.

A point x in world coordinates is projected onto the camera image plane by the following pin-hole model:

$$x_c' = K_c(I0)x \quad (1)$$

where x is a 4×1 vector representing the world point location in homogenous coordinates, $K_c$ is the 3×3 upper-triangular intrinsic camera matrix, $$K_c = \begin{pmatrix} f_x & & c_x \\ & f_y & c_y \\ & & 1 \end{pmatrix}, \quad (2)$$

and $x_c$ is the 3×1 vector of uncorrected homogenous camera coordinates. The camera system of coordinates is assumed to coincide with the world coordinate system; therefore, trivial rotation and translation (extrinsic) matrices are imposed.

To account for the lens distortion, a parametric distortion model is applied. The corrected camera coordinates vector $x_c$ is related to its uncorrected counterpart $x_c'$ through the following inverse model:

$$x_c' = K_c D_\alpha(K_c^{-1} x_c) \quad (3)$$

where $D_\alpha$ is a plane-to-plane map given by $$x' = (1 + \alpha_1 \rho^2 + \alpha_2 \rho^4 + \alpha_3 \rho^6)x + 2\alpha_4 xy + \alpha_5(\rho^2 + 2x^2)$$

$$y' = (1 + \alpha_1 \rho^2 + \alpha_2 \rho^4 + \alpha_3 \rho^6)y + 2\alpha_5 xy + \alpha_4(\rho^2 + 2y^2) \quad (4)$$

with $\rho^2 = x^2 + y^2$. The parameters $\alpha_1, \alpha_2, \alpha_3$ govern the radial distortion component, while $\alpha_4$ and $\alpha_5$ account for the tangential one. The vector $\alpha = (\alpha_1, \ldots, \alpha_5)^T$ is called the camera inverse distortion parameters.

The projector is modeled as a one-dimensional pin-hole system:

$$x_p = K_p(R_p t_p)x = P_p x, \quad (5)$$

where $x_p$ is the 2×1 vector of homogenous coordinates on the projector line, $K_p$ is the 2×3 intrinsic matrix, and $R_p$, $t_p$ are the extrinsic rotation and translation transformation parameters between the camera and the projector coordinate systems. The intrinsic and the extrinsic projector parameters may be combined into a single 2×4 projection matrix $P_p$.

A pixel may be identified at position position $x_c = (x_c, y_c, 1)^T$ in the camera image plane, and the corresponding $x_p = (x_p, 1)^T$ on the projector line. By applying the inverse distortion model (equation 3), a corrected pixel location $x_c' = (x_c', y_c', 1)^T$ results. The pin-hone camera projection (equation 1) introduces ambiguity by projecting all points along the ray x=rd, r>0, to $x_c'$.

In order to characterize the ray $d = (d_x, d_y, d_z)^T$, $$\beta x_c' = K_c d, \quad (6)$$

where $\beta \neq 0$ is an arbitrary scaling factor. This yields:

$$d_z x_c' = (K_c)^T_1 d = f_x d_x + c_x d_z$$

$$d_z y_c' = (K_c)^T_2 d = f_y d_y + c_y d_z \quad (7)$$

where $(K_c)_i^T$ denotes the i-th row vector of $K_c$. Solving for $d_x, d_y$ and $d_z$ gives:

$$d = \begin{pmatrix} f_x^{-1}(x_c' - c_x) \\ f_y^{-1}(y_c' - c_y) \\ 1 \end{pmatrix} \quad (8)$$

Since the pixel grid is fixed at reconstruction, the described process is precomputed for every pixel in the image. The projector forward model (equation 5) introduces ambiguity by projecting an entire plane onto $x_p$; however, the intersection of the latter plane with the ray x=rd yields a unique point in space. Substituting the unit direction $\hat{d} = d/\|d\|$ into the projector model gives:

$$\beta x_p = P_p \begin{pmatrix} r\hat{d} \\ 1 \end{pmatrix}, \quad (9)$$

which can be rewritten as:

$$x_p = \frac{r p_1^T \hat{d} + q_1}{r p_2^T \hat{d} + q_2} = \frac{r p_1^T d + q_1 \|d\|}{r p_2^T d + q_2 \|d\|} \quad (10)$$

where the projector matrix is decomposed into:

$$P_p = \begin{pmatrix} p_1^T & q_1 \\ p_2^T & q_2 \end{pmatrix}. \quad (11)$$

Solving for r, one has $$r = \frac{\tau_1 x_p + \tau_2}{\tau_3 x_p + \tau_4} \quad (12)$$

where:

$$\tau_1 = q_2 \|d\| \\ \tau_2 = -q_1 \|d\| \\ \tau_3 = p_2^T d \\ \tau_4 = -p_1^T d \quad (13)$$

are scalar coefficients depending only on the pixel location $x_c$ (and therefore can be be precomputed). We refer to $\tau_1, \ldots, \tau_4$ as range triangulation coefficients. Note that using the unnormalized ray saves one division operation.

The reconstructed point is given by $$x = r\hat{d} = \frac{q_2 x_p - q_1}{\tau_3 x_p + \tau_4} d. \quad (14)$$

Summarized in a compact form, the backward model is given by:

$$r = r(x_p, x_c; \alpha, K_c, P_p) \\ x = x(x_p, x_c; \alpha, K_c, P_p). \quad (15)$$

During calibration, a known planar calibration object consisting of M points $\{x^m\}$ (in a self coordinate system) is presented to the system from N views described by the (unknown) view transformations $\{R_n, t_n\}$. The world coordinates of the m-th point in the n-th view are denoted as:

$$x^{mn} = (R_n, t_n) x^m \quad (16)$$

(Again, homogenous coordinates are used). As the result, the corresponding camera and projector coordinates $x_c^{mn}$ and $x_p^{mn}$ are recorded.

The goal of the calibration process is to establish the system parameters $K_c$, $P_p$ and $\alpha$. The process consists of coarse calibration where an initial estimate of the parameters is obtained, followed by the refinement stage, at which stage the parameters are refined.

Figure 3:
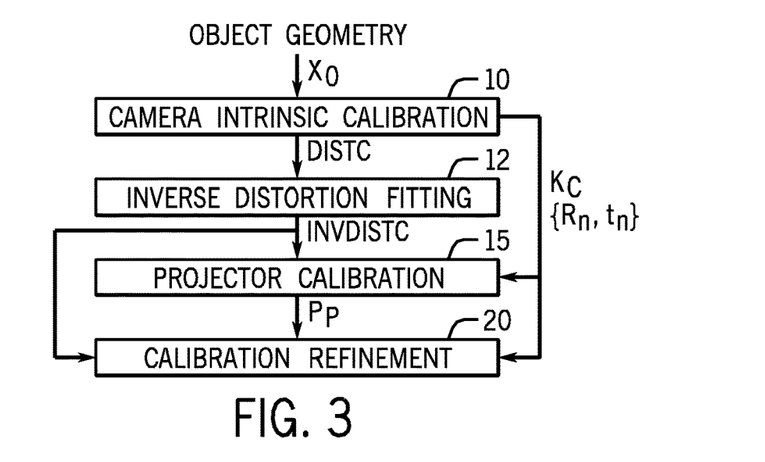
FIG. 3 is a flow chart for one embodiment.

Referring to FIG. 3, a camera intrinsic calibrator stage 10 receives an object geometry $x_0$. Ignoring the lens distortion model (setting $\alpha=0$), the intrinsic camera matrix $K_c$ can be recovered using Zhang's technique, by which a homogray $H_n$ is fit between the object and the camera coordinate systems. From the homographies, $K_c$ and the view transformations $R_n, t_n$ are recovered and set to calibration refinement 20.

An inverse distortion fitting 12 is then done.

A projector calibration procedure 15 suitable for one-dimensional projections is proposed.

Assuming known $R_n, t_n$, the forward projector model is used to obtain the relation:

$$\beta x_p^{mn} = P_p (R_n t_n) x^m = P_p x^{mn}, \quad (17)$$

where $\beta$ is an arbitrary scaling. Rewriting explicitly, $$x_p^{mn} (P_p)_2^T x^{mn} = (P_p)_1^T x^{mn} \quad (18)$$

from where:

$$((x^{mn})^T - x_p^{mn}(x^{mn})^T) \begin{pmatrix} (P_p)_1 \\ (P_p)_2 \end{pmatrix} = 0 \quad (19)$$

for every m and n. Here $(P_p)_i^T$ denotes the i-th row of $P_p$. Denoting:

$$a_{mn}^T = ((x^{mn})^T - x_p^{mn}(x^{mn})^T) \quad (20)$$

and the 8×1 vector $p^T = ((P_p)_1^T, (P_p)_2^T)$, a unit p is search for minimizing $$\Sigma_{mn} \|a_{mn}^T p\|^2 = \Sigma_{mn} p^T a_{mn}^T p. \quad (21)$$

Such a scaling is possible due to the scale ambiguity of the projection matrix $P_p$. Denoting:

$$A = \Sigma_{mn} a_{mn} a_{mn}^T, \quad (22)$$

p is found as the smallest eigenvector of A. Once p has been found, it is reshaped into $P_p$.

Once the initial estimate of the system parameters has been established by the coarse calibration procedure, refinement is performed (block 20). The refined parameters are sought to minimize the geometric reconstruction error:

$$E(\alpha, K_c, P_p, \{R_n, t_n\}, \{x_m\}) = \Sigma_{mn} \|x(x_p^{mn}, x_c^{mn}; \alpha, K_c, P_p) - R_n x^m - t_n\|^2$$

In addition to system parameters, $\alpha$, $K_c$, $P_p$ the view transformations $\{R_n, t_n\}$ and, potentially, the coordinates of the calibration object also participate as optimization variables. This gives the procedure more accuracy in some embodiments.

Figure 4:
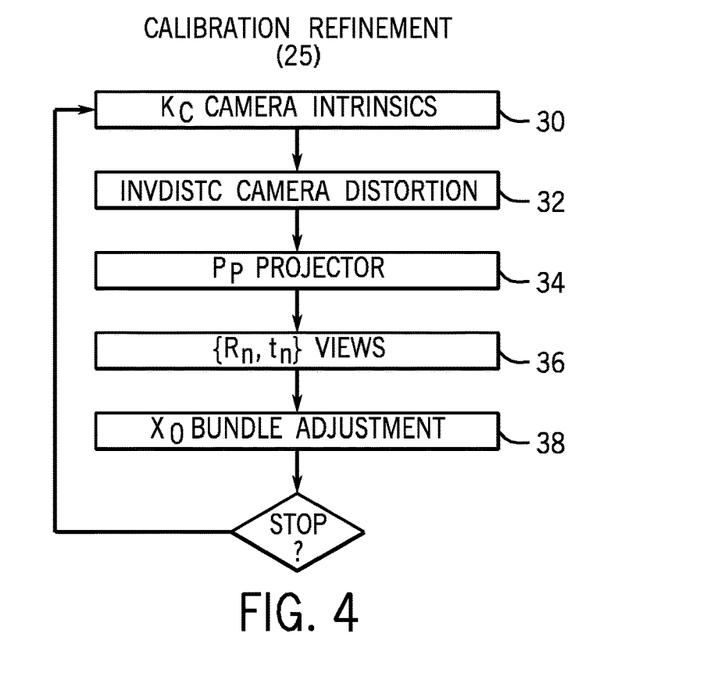
FIG. 4 is a flow chart for a calibration referenced sequence.

In a preferred embodiment, refinement 25 in FIG. 4 is performed by iterating until convergence the following sequence of steps. All parameters but $K_c$ are fixed to determine the camera intrinsic matrix $K_c$ as indicated in block 30. The geometric error becomes:

$$E(K_c) = \Sigma_{mn} \|r(x_p^{mn}, d_{K_c}(x_c^{'mn})) d_{K_c}(x_c^{'mn}) - x'^{mn}\|^2, \quad (23)$$

where r is given in equation 12, and $x'^{mn}_c = D_\alpha(x_c^{mn})$ are precomputed from the data. Due to the modest size of the problem (four degrees of freedom), a few safeguarded Newton iterations are used.

All parameters but $\alpha$ are fixed to determine camera distortion (block 32). The error function assumes the form:

$$E(\alpha) = \Sigma_{mn} \|r(x_p^{mn}, d_{K_c}(D_\alpha)(x_c^{mn}) d_{K_c}(D_\alpha(x_c^{mn})) - x^{mn}\|^2. \quad (24)$$

Due to the modest size of the problem (up to six degrees of freedom), a few safeguarded Newton iterations are used.

All parameters but $P_p$ are fixed, to determine projector matrix $P_p$ (block 34) and minimize $$E(P_p) = \Sigma_{mn} \|r_{P_p}(x_p^{mn}, d^{mn}) d^{mn} - x^{mn}\|^2, \quad (25)$$

where $d^{mn} = d_{K_c}(D_\alpha(x_c^{mn}))$ are precomputed from the data. Due to the modest size of the problem (seven degrees of freedom), a few safeguarded Newton iterations are used.

Fixing the reconstructed points $y^{mn} = x(x_p^{mn}, x_c^{mn}; \alpha, K_c, P_p)$, the error function for the n-th view becomes:

$$E(R_n, t_n) = \Sigma_m \|y^{mn} - R_n x^m - t_n\|^2, \quad (26)$$

which has a classical singular value decomposition (SVD)-based closed-form minimizer.

Since frequently the knowledge of the calibration object points is only approximate, this final bundle adjustment (block 38) step gives further accuracy to the calibration procedure. We fix all parameters but the $x^m$'s are fixed and minimize:

$$E(\{x^m\}) = \Sigma_{mn} \|y^{mn} - R_n x^m - t_n\|^2 = \Sigma_{mn} \|R_n^T(y^{mn} - t_n) - x^m\|^2 \quad (27)$$

for which the closed-form minimizer $$x^m = \frac{1}{N} \Sigma_n R_n^T (y^{mn} - t_n) \quad (28)$$

is used.

When a real acquisition system is assembled, manufacturing imperfections do not allow perfect reproducibility of all system parameters. While the accuracy of the camera and projector optics can be fairly high, the positioning of the two components themselves can result in misalignments. The above-described reconstruction is particularly sensitive to angular misalignments of the projector about its one-dimensional projection line.

While it is extremely costly to fully calibrate the entire system from scratch requiring multiple views of the calibration object (and hence time spent in the production line), a novel calibration correction approach may be used within a single lot, manufacture tolerances allow high repeatability of the intrinsic parameters $K_c$ and $\alpha$. Likewise, the projector matrix $P_p$ can be decomposed into the 2×3 intrinsic matrix $K_p$, and the extrinsic parameters $R_p$, $t_p$, as described by (equation 5). Out of these parameters, only the extrinsics $R_p$, $t_p$ are significantly affected by assembly imperfections.

$R_p$, $t_p$ may be refined starting with the result of the full calibration as the initial guess and minimizing the geometric error $$E(R_p, t_p) = \Sigma_{mn} \|x(x_p^{mn}, x_c^{mn}; \alpha, K_c, K_p(R_p t_p)) - x^{mn}\|^2. \quad (29)$$

under the constraint $R_p^T R_p = I$. Standard second-order cone programming techniques may be used to solve the constrained problem. The number of participating views can be as little as one or a few.

Standard methods cannot be used to recover $K_p$, $R_p$ and $t_p$ from the projector matrix $P_p$ found by the calibration procedure, as the projection system is one-dimensional. Instead, the following modified technique is suggested.

Let $P_p = (Qq)$ with a 2×2 matrix Q and a 2×1 vector q. Substituting into (equation 5), we have $$Q = K_p R_p,$$

$$q = K_p t_p. \quad (30)$$

Since $R_p$ is orthonormal, $$QQ^T = K_p R_p R_p^T K_p^T = K_p K_p^T. \quad (31)$$

Hence, $K_p$ is recovered as the inverse of the Cholesky factor of $(QQ^T)^{-1}$.

Once $K_p$ has been recovered, the extrinsic parameters are recovered by substituting $K_p$ into (equation 30) and solving for $R_p$ and $t_p$. $K_p$ is then normalized by $(K_p)_{23}$ to simplify further operations with it.

Figure 5:
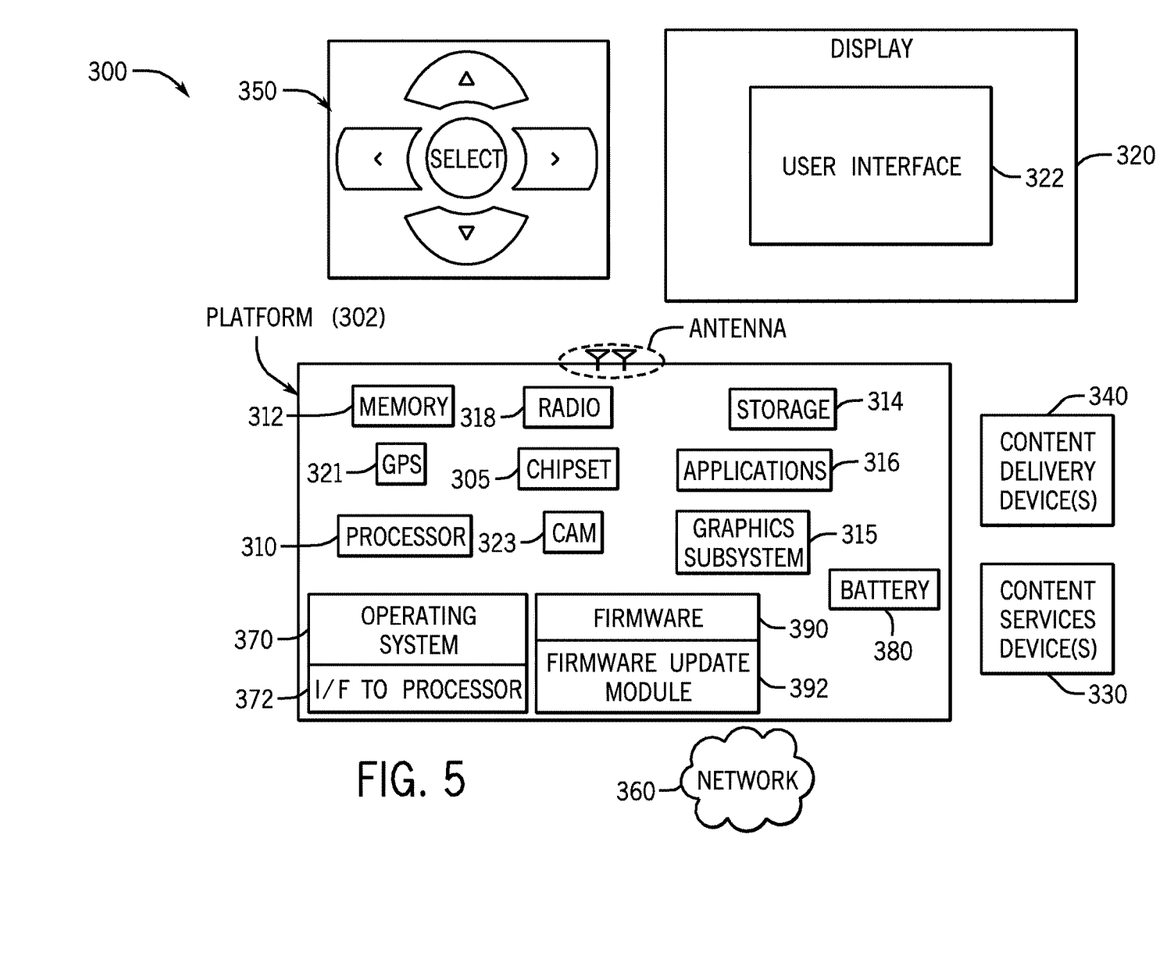
FIG. 5 is a system depiction for one embodiment.

FIG. 5 illustrates an embodiment of a system 300. In embodiments, system 700 may be a media system although system 300 is not limited to this context. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
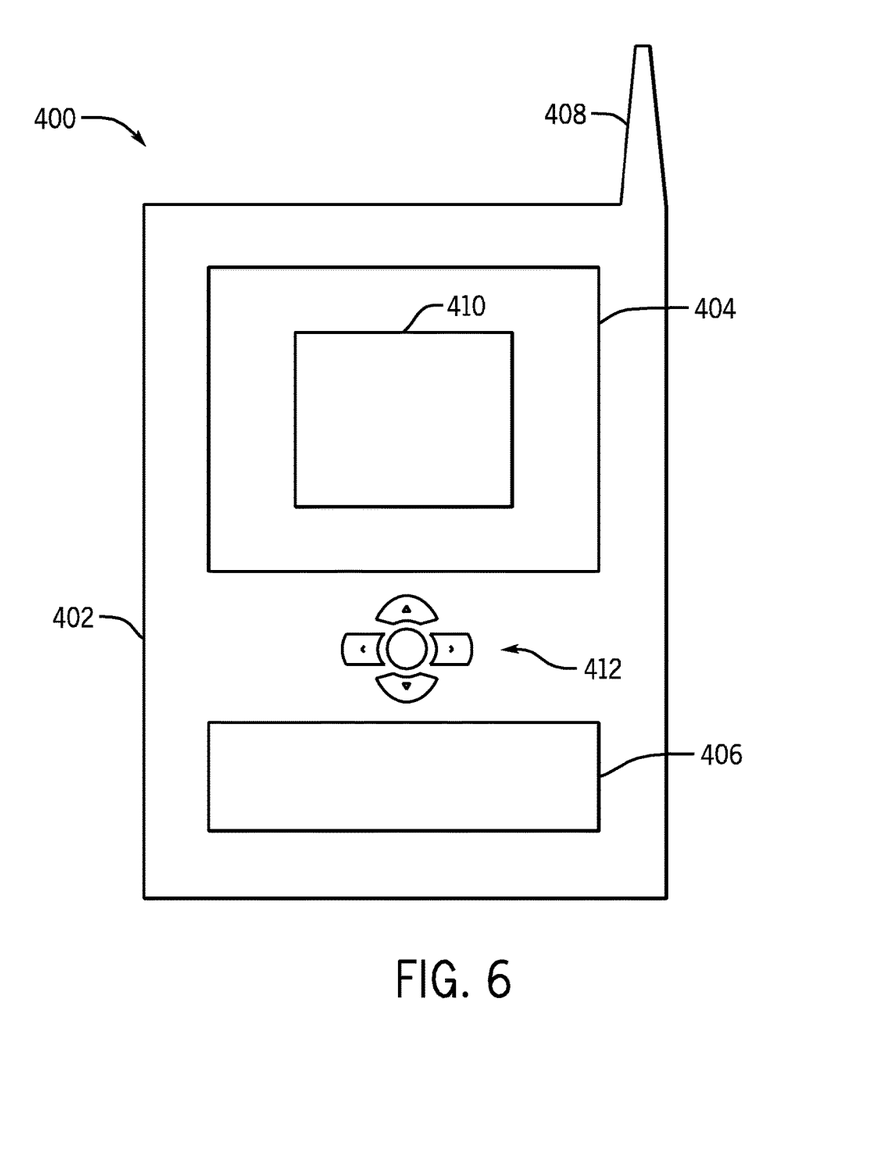
FIG. 6 is a front elevational view for one embodiment.

As described above, system 300 may be embodied in varying physical styles or form factors. FIG. 6 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIGS. 3 and 4 in software and/or firmware embodiments. Particularly the sequences may be implemented by one or more non-transitory storage devices storing computer implemented instructions.

As shown in FIG. 6, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 806 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The following clauses and/or examples pertain to further embodiments:

One example embodiment may be a method comprising performing camera calibration followed by inverse distortion fitting, thereafter calibrating for a projector that projects onto a camera image plane, and thereafter performing fine calibration to minimize geometric reconstruction error. The method may also include performing a camera intrinsic calibration using an object geometry, recovering an intrinsic camera matrix as the inverse of a Clolesky factor and using $K_p$ to recover intrinsic parameters, fitting a homography between object and camera coordinate systems, and recovering view transformations. The method may also include performing calibration refinement. The method may also include using an initial estimate of system parameters to minimize the geometric reconstruction error. The method may also include using system parameters and view transformation as optimization variables. The method may also include iterating until convergence is achieved. The method may also include fixing all parameters except the intrinsic camera matrix to determine camera distortion. The method may also include fixing all parameters except camera inverse distortion parameters and minimizing the geometric reconstruction error. The method may also include fixing all parameters except the projector matrix to determine projector matrix. The method may also include fixing the reconstructed points. The method may also include fixing all parameters except the $x^m$'s and minimizing the reconstruction error.

In another example embodiment may be one or more computer readable media storing instructions to perform a sequence comprising performing camera calibration followed by inverse distortion fitting, thereafter calibrating for a projector that projects onto a camera image plane, and thereafter performing fine calibration to minimize geometric reconstruction error. The media may include performing a camera intrinsic calibration using an object geometry, recovering an intrinsic camera matrix as the inverse of a Cholesky factor and using $K_p$ to recover intrinsic parameters, fitting a homography between object and camera coordinate systems, and recovering view transformations. The media may include said sequence including performing calibration refinement. The media may include said sequence including using an initial estimate of system parameters to minimize the geometric reconstruction error. The media may include said sequence including using system parameters and view transformation as optimization variables. The media may include said sequence including iterating until convergence is achieved. The media may include said sequence including fixing all parameters except the intrinsic camera matrix to determine camera distortion. The media may include said sequence including fixing all parameters except camera inverse distortion parameters and minimizing the geometric reconstruction error. The media may include said sequence including fixing all parameters except the projector matrix to determine projector matrix. The media may include said sequence including fixing the reconstructed points. The media may include said sequence including fixing all parameters except the $x^m$'s and minimizing the reconstruction error.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    performing camera calibration followed by inverse distortion fitting to correct both radial and tangential lens distortion;
    thereafter calibrating for a projector that projects onto a camera image plane;
    thereafter performing fine calibration to reduce geometric reconstruction error;
    using system parameters and view transformation as optimization variables; and
    fixing all parameters except a planar calibration object's m points, $x^m$'s, and minimizing the reconstruction error.

2. A method of claim 1 comprising:
    performing a camera intrinsic calibration using an object geometry;
    recovering an intrinsic camera matrix as the inverse of a Clolesky factor and using a 2×3 intrinsic matrix, Kp, to recover intrinsic parameters;
    fitting a homography between object and camera coordinate systems; and
    recovering view transformations.

3. The method of claim 2 including performing calibration refinement.

4. The method of claim 3 including using an initial estimate of system parameters to minimize the geometric reconstruction error.

5. The method of claim 4 including iterating until convergence is achieved.

6. The method of claim 1 including fixing the reconstructed points.

7. One or more non-transitory computer readable media storing instructions to perform a sequence comprising:
    performing camera calibration followed by inverse distortion fitting to correct both radial and tangential lens distortion;
    thereafter calibrating for a projector that projects onto a camera image plane;
    thereafter performing fine calibration to reduce geometric reconstruction error;
    using system parameters and view transformation as optimization variables; and
    fixing all parameters except a planar calibration object's m points, $x^m$'s, and minimizing the reconstruction error.

8. The media of claim 7 further comprising:
    performing a camera intrinsic calibration using an object geometry;
    recovering an intrinsic camera matrix as the inverse of a Cholesky factor and using a 2×3 intrinsic matrix, Kp to recover intrinsic parameters;
    fitting a homography between object and camera coordinate systems; and
    recovering view transformations.

9. The media of claim 8, said sequence including performing calibration refinement.

10. The media of claim 9, said sequence including using an initial estimate of system parameters to minimize the geometric reconstruction error.

11. The media of claim 10, said sequence including iterating until convergence is achieved.

12. The media of claim 7, said sequence including fixing the reconstructed points.

* * * * *